United States Patent
Kosovan

(10) Patent No.: US 9,703,786 B2
(45) Date of Patent: Jul. 11, 2017

(54) SYSTEMS AND METHODS OF RECLAIMING STORAGE SPACE

(71) Applicant: Oleksandr Kosovan, Kiev (UA)

(72) Inventor: Oleksandr Kosovan, Kiev (UA)

(73) Assignee: MACPAW INC., Santa Clara, CA (US)

( * ) Notice: Subject to any disclaimer, the term of this patent is extended or adjusted under 35 U.S.C. 154(b) by 0 days.

(21) Appl. No.: 13/725,017

(22) Filed: Dec. 21, 2012

(65) Prior Publication Data

US 2013/0110888 A1    May 2, 2013

(51) Int. Cl.
*G06F 17/30* (2006.01)

(52) U.S. Cl.
CPC .... *G06F 17/3007* (2013.01); *G06F 17/30117* (2013.01)

(58) Field of Classification Search
CPC .................................. G06F 17/30117
USPC ........................................ 707/822
See application file for complete search history.

(56) References Cited

U.S. PATENT DOCUMENTS

| | | | |
|---|---|---|---|
| 2007/0208773 A1* | 9/2007 | Tsao .......................... | 707/103 R |
| 2007/0239949 A1* | 10/2007 | Childs et al. ................ | 711/162 |
| 2008/0162557 A1* | 7/2008 | Boda ................ | G06F 17/30038 |
| 2008/0256242 A1* | 10/2008 | Liebman ............. | G11B 27/034 |
| | | | 709/226 |
| 2009/0100068 A1* | 4/2009 | Gauba et al. ................... | 707/10 |
| 2010/0235831 A1* | 9/2010 | Dittmer ............................ | 718/1 |
| 2010/0287053 A1* | 11/2010 | Ganong et al. ............ | 705/14.66 |
| 2010/0306171 A1* | 12/2010 | Antos et al. .................. | 707/638 |
| 2011/0035421 A1* | 2/2011 | Laird-McConnell et al. ............................. | 707/822 |
| 2011/0119583 A1* | 5/2011 | Gilley .................. | G11B 27/002 |
| | | | 715/716 |
| 2011/0137964 A1* | 6/2011 | Goldman ................ | G06T 7/001 |
| | | | 707/822 |
| 2011/0295798 A1* | 12/2011 | Shain ........................... | 707/617 |
| 2011/0302556 A1* | 12/2011 | Drukman .................. | G06F 8/33 |
| | | | 717/113 |
| 2012/0089798 A1* | 4/2012 | Prahlad et al. ............... | 711/162 |
| 2012/0327097 A1* | 12/2012 | Mostafa et al. .............. | 345/555 |

OTHER PUBLICATIONS

Engst, "Visual QuickStart Guide iPhoto '09 for Mac OS X", Peachpit Press, p. 19.*

* cited by examiner

*Primary Examiner* — Heather Herndon
*Assistant Examiner* — Matthew Ellis
(74) *Attorney, Agent, or Firm* — Procopio, Cory, Hargreaves & Savitch LLP

(57) ABSTRACT

Systems and methods for reclaiming storage space are described, including detecting a user input indicating removing a corresponding copy of each media file of a group of one or more media files; selecting the group of one or more media files; identifying the corresponding copy of each media file of the group of one or more media files; and removing from storage space the corresponding copy of each media file of the group of one or more media files.

15 Claims, 12 Drawing Sheets

SYSTEMS AND METHODS OF RECLAIMING STORAGE SPACE

BACKGROUND

Related Field

The subject matter discussed herein relates generally to media files management and, more particularly, to systems and methods for reclaiming storage space.

Related Background

Some media file management applications (e.g., iPhoto produced by Apple Inc.) preserve the media files imported by the application as, for example, original or master copy. When one or more operations need to be performed on an original media file, a copy (modification copy) of the media file is created to apply the operations. An operation may be initiated by a user, such as reducing red eyes in an image. An operation may not be initiated by a user, such as adjusting the orientation or rotating of an image.

The more media files having one or more operations apply to them, the more media files having master copy and modification copy.

SUMMARY

Systems and methods for reclaiming storage space are described. The described systems and method can reclaim, based on average usage, 30% of storage space used for storing media files. Depending on the collection of media files and the operations applied to them, a lower or higher percentage of storage space may be reclaimed.

The subject matter includes a method for detecting a user input indicating removing a corresponding copy of each media file of a group of one or more media files; selecting the group of one or more media files; identifying the corresponding copy of each media file of the group of one or more media files; and removing from storage space the corresponding copy of each media file of the group of one or more media file The method may be implemented in one or more computing devices and stored in computer readable media.

DETAILED DESCRIPTION

The subject matter described herein is taught by way of example implementations. Various details have been omitted for the sake of clarity and to avoid obscuring the subject matter. The examples shown below are directed to structures and functions for implementing systems and methods for reclaiming storage space.

Figure 1:
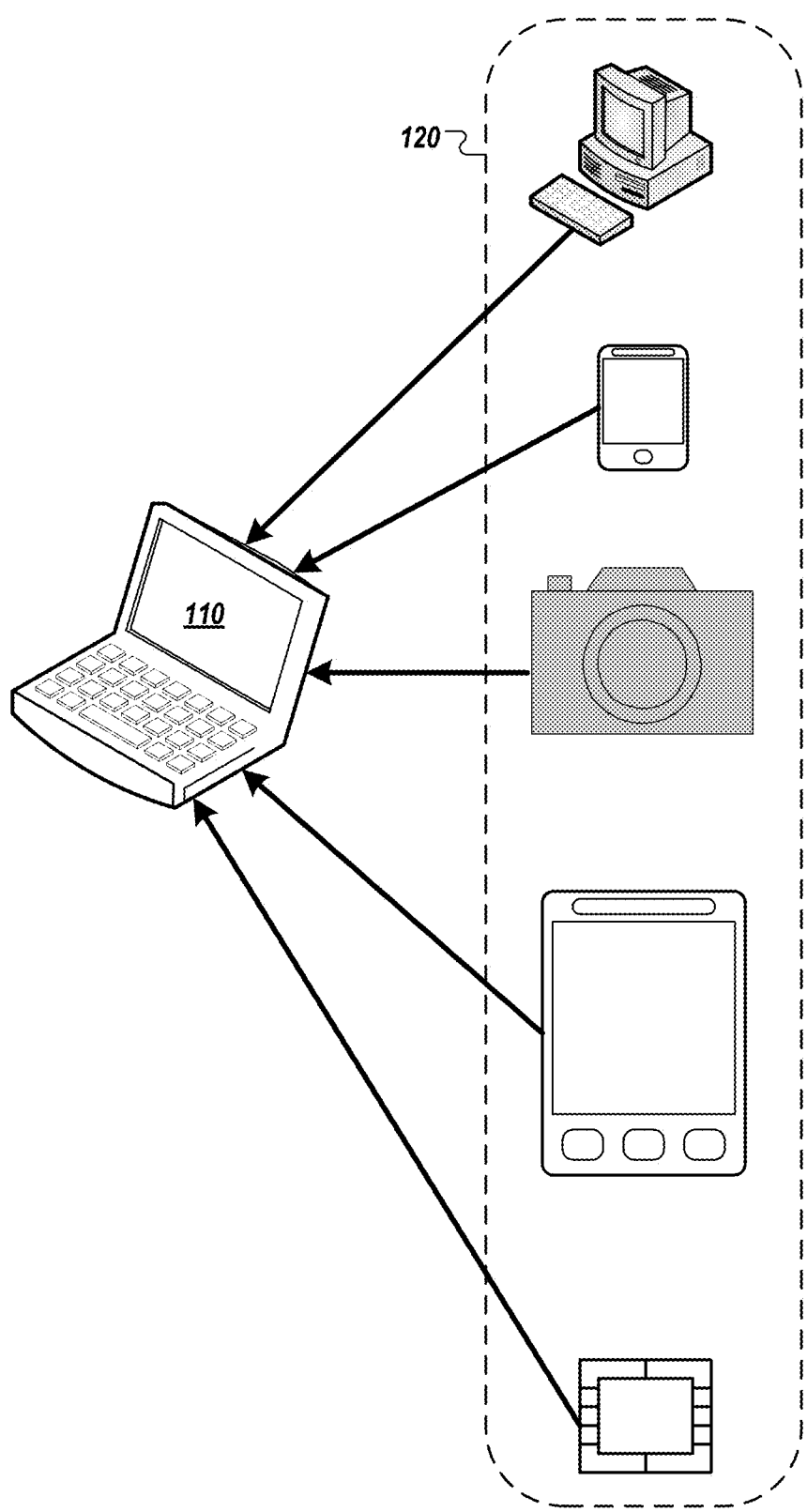
FIG. 1 shows various example sources of media files.

FIG. 1 shows various example sources of media files. FIG. 1 depicts a computing device 110 that may be connected to one or more external devices or sources 120. Sources 120 may provide media files (e.g., images and/or videos) to computing device 110.

Examples of computing device 110 may be any computing device capable of executing a media file management application. For example, if the media file management application is iPhoto, which executes on a device that runs a version of the OS X operating system or the like, computing device 110 may be any device that runs a version of OS X or the like either natively or in a virtual machine. For example, computing device 110 may be an Apple Macintosh®, an Apple Mac® computing device, a Power Mac®, an iMac®, an PowerBook®, iBook®, MacBook Air®, MacBook Pro®, Mac Mini®, Mac Pro®, or any computing device that may run OS X or the like in a native or virtual mode.

Example of sources 120 may include another computing device, a cellular or smartphone, a personal data assistant (PDA), a camera, a video recorder, a camcorder, a tablet computing device, a memory card reader, a scanning device, a cloud storage, and any other sources of media files.

Computing device 110 may read or import (collectively referred to as import) one or more media files from one or more sources 120 at a time. Once a media file is read or imported, the media file may be stored in any location accessible by at least the computing device 110. For example, the media file may be stored in a local storage, a connected or networked storage, or on cloud storage.

As described herein, a media file may contain image data or video data. Image data or image may be any still (e.g., none moving) data, such as a photo and/or text. Video data may be a video, a movie, a segment of a video or movie, or two or more frames of image data that advance over a period of time to provide a moving appearance.

Figure 2A:
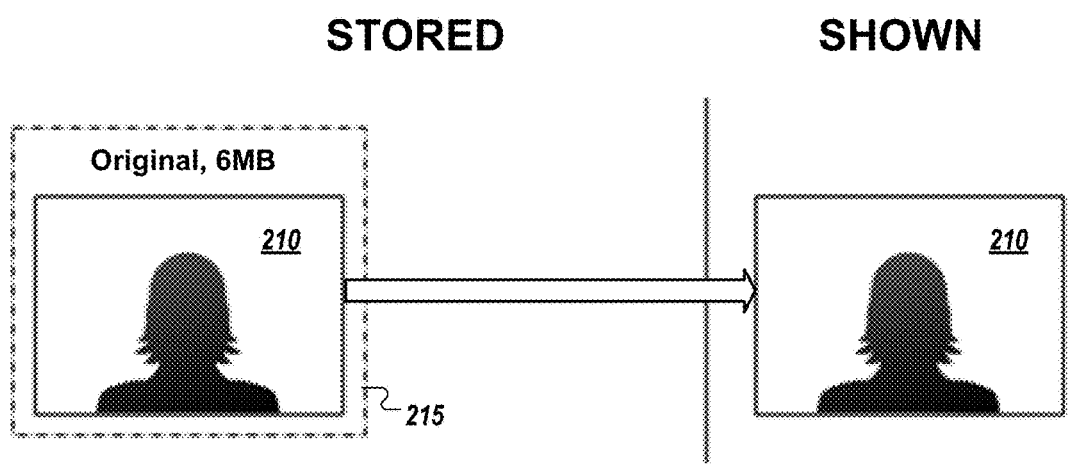
FIGS. 2A-D show examples of media files management.

FIGS. 2A-D show examples of media files management. FIG. 2A shows that, for example, a media file 210 has been imported to a storage. For example, a user may use iPhoto to import media file 210 into an iMac®. Media file 210 may be stored in any storage accessible by the iMac®. Box 215 illustrates that media file 210 is not corresponding to another media file. When media file 210 is shown, presented, or displayed on the iMac® (the right of FIG. 2A), the exact copy of media file 210 is used. As labeled on FIGS. 2A-D and 6A-C, "SHOWN" means showing, presenting, or displaying a media file. However, the media file may be shown in a scale that is not 100%. For example, a thumbnail or a reduced-scale version produced from the media file may be shown.

Figure 2B:
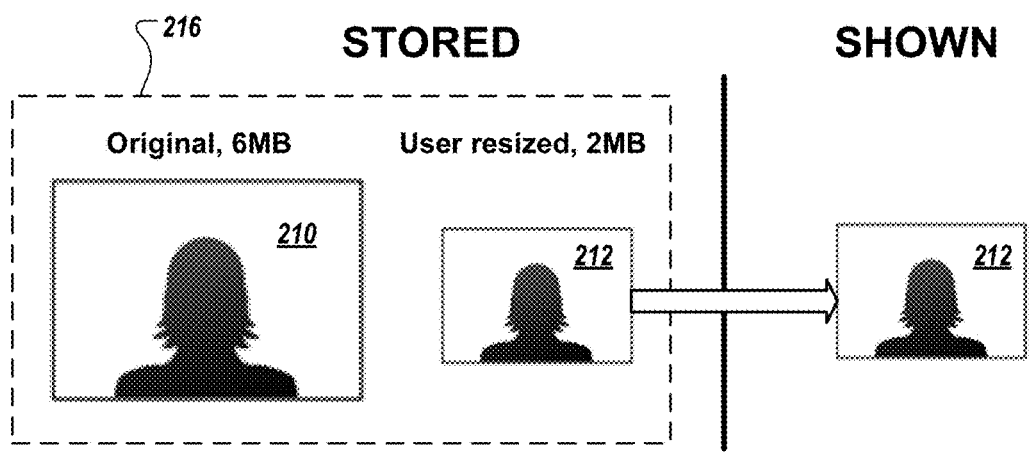

FIG. 2B shows, for example, a user may apply one or more operations to media file 210. The user may resize, crop, adjust, or modify in any way, etc. media file 210. Some media file management application (e.g., iPhoto) saves the original media file 210 (e.g., the imported copy) as a master copy. When one or more operations need to be applied to an image, the operations are applied to a copy duplicated from the master. The duplicate copy that is modified by one or more operations maybe referred to as a modification copy.

For example, the master copy of media file 210 may be a 6 megabytes (MB) image. The user may resize image 210 to a 2 MB image. The resize operation may be applied to a duplicate copy 212. The resize operation may be performed on the total pixels (e.g., resizing a 3000×2000 pixel image to a 1000×700 pixel image) and/or compression (e.g., a lower compression rate). Box 216 illustrates that image 210 and image 212 are corresponding copies of the same image. Image 212 maybe shown to the user (e.g., by iPhoto).

Figure 2C:
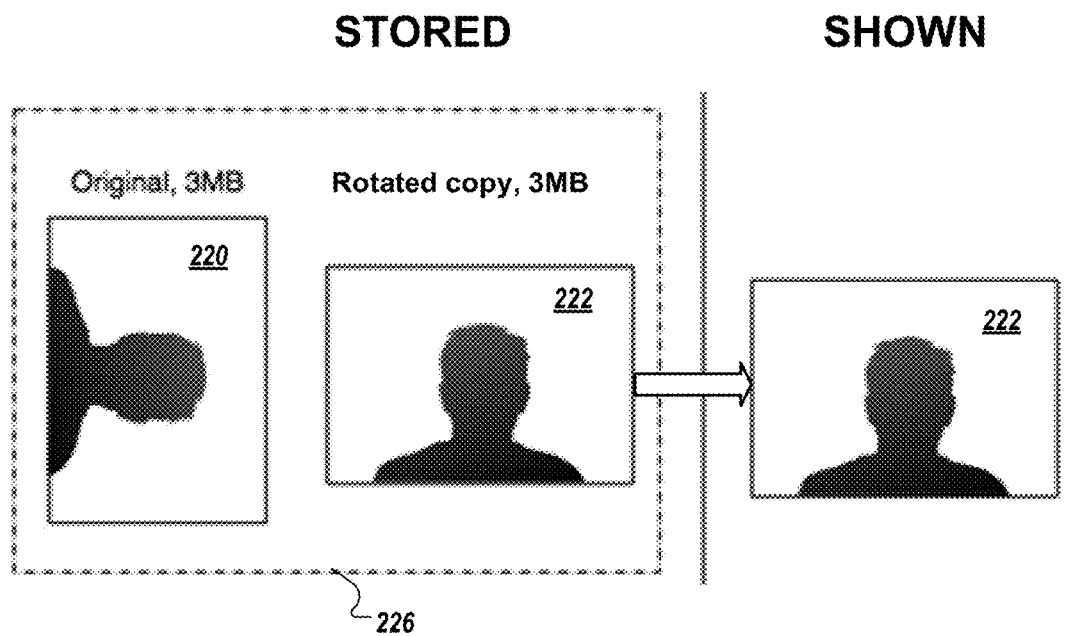

FIG. 2C shows that media file 220 (e.g., an image) may have been rotated at the source (e.g., a camera). The rotation may be, for example, indicated using a setting found in the image's metadata (e.g., an orientation flag). While importing, iPhoto analyzes the photo orientation flag and detects that it is set. iPhoto may protect the master image 220 in its existing form (e.g., not related) and generate image 222, a rotated copy of image 220.

In the process of importing a 3 MB image 220, two 3 MB images (6 MB total) are stored by iPhoto. A user may never see the master image 220 in iPhoto. Box 226 illustrates that image 220 and 222 are corresponding copies of the same image.

Figure 2D:
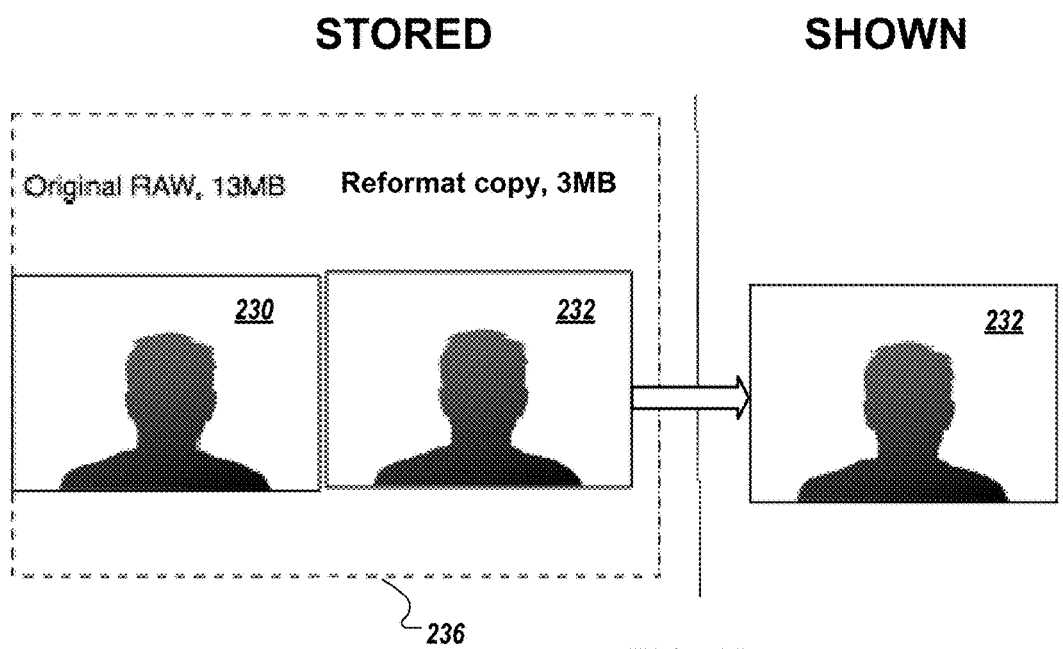

FIG. 2D shows that a user may take pictures in the RAW format and stores them in his or her iPhoto library (e.g., imported into the library using iPhoto). While importing, iPhoto saves the RAW images as masters and converts copies of the RAW images into, for example, Joint Photographic Experts Group (JPEG) images. Here, FIG. 2D shows a RAW image 230 and a corresponding JPEG image 232. Box 236 illustrates that images 230 and 232 are corresponding images. The user interface of a media file management application (e.g., iPhoto) may show only the JPEG image 232 (e.g., by default).

Figure 3A:
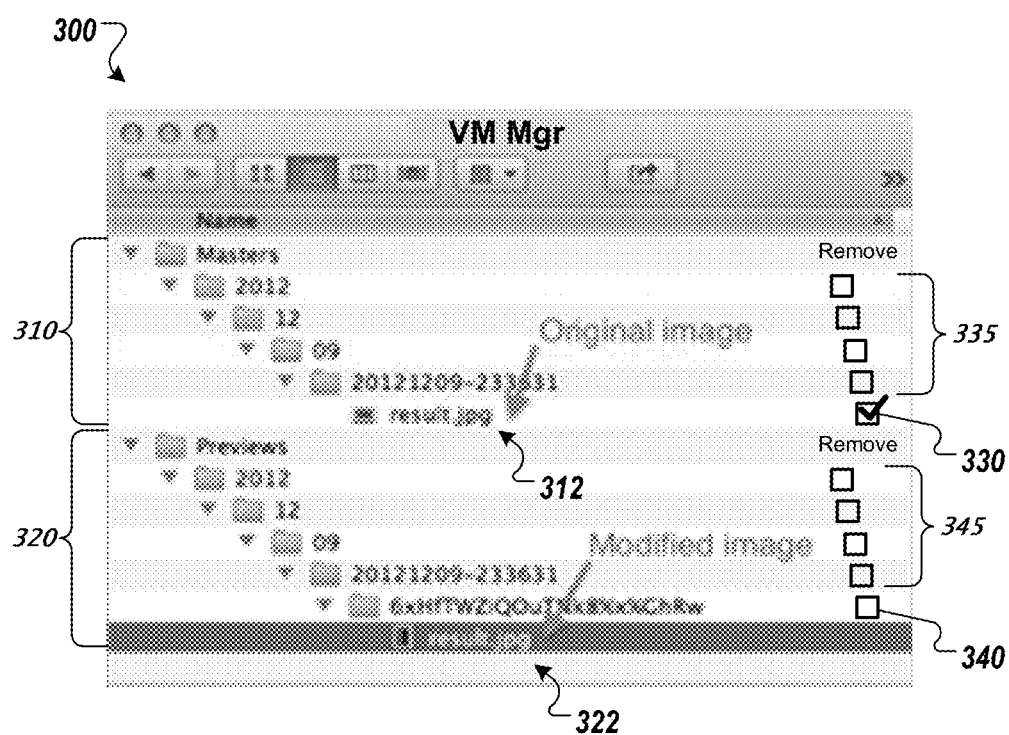
FIG. 3A shows an example user interface and an example management of corresponding media files.

FIG. 3A shows an example user interface and an example management of corresponding media files. User interface 300 of an application "VM Mgr" (e.g., an iPhoto or the like) shows master media files 310 (e.g., "Masters") and corresponding modification (e.g., "Previews") media files 320. For example, "result.jpg" 312 is a master or original copy. Its corresponding modification copy is "result.jpg" 322.

User interface (UI) 300 shows controls 330 and 335 are associated with the master copy and controls 340 and 345 are associated with the modification copy. For example, if a user wants to request to remove media file 312, control 330 may be used (e.g., marked with a checkmark, as shown). If the user wants to request to remove media file 322, control 340 may be used (e.g., marked with a checkmark, not shown). In some implementations, a user is prevented from accidentally requesting to remove both the master copy and the modification copy of the same media file (e.g., when a user marks both controls 330 and 340 with checkmarks, the user may be prompted to ensure that the user's intention is to remove both the master copy and the modification copy of the same media file).

UI 300 shows that media files may be organized and/or presented by folders (e.g., a folder 2012 contains a folder 12, which contains a folder 09, which contains a folder 20121209-233631, etc.). What is shown is only an example. Media files may be organized and/or presented in any fashion or organization.

The master copy 310 and the modification copy 320 of media files may be stored in a library using, for example, a Structured Query Language (SQL) database. In some implementations, the SQL database may be used to store the information (e.g., metadata and/or other information) about the master copy 310 and the modification copy 320. The media files may or may not be stored in a SQL database. To identify one or more modified media files and/or their corresponding master media files, the SQL database may be queried to locate information about the modified media files and/or their corresponding master media files. For example,
if universally unique identifiers (UUIDs) are assigned to the modified media files, an SQL query to locate the master media file 312 and modified media file 322 may yield the path of master media file 312 at /Masters/2012/12/09/20121209-233631/result.jpg; and yield the path of the modified media file 322 at /Previews/2012/12/09/20121209-233631/6xHfTWZiQOuTNk8\% x\% GhRw/result.jpg. Media file 322 may be located with the UUID 6xHfTW-ZiQOuTNk8\% x\% GhRw as shown. In some implementations, information about the modification copy may be stored in a metadata database.

If a user marks control 330, indicating a request to remove the master media file 312, the master media file 312 at /Masters/2012/12/09/20121209-233631/result.jpg is removed or deleted from the library (e.g., deleted from the database and storage).

In some implementations, the modified media file 322 at /Previews/2012/12/09/20121209-233631/6xHfTW-ZiQOuTNk8\% x\% GhRw/result.jpg may be moved to the original location of the master file 312 (/Masters/2012/12/09/20121209-233631/result.jpg).

In some implementations, metadata of the new master file 312 (e.g., moved from file 322) may be updated. For example, a new master size may be set, information about editing may be reset, and/or other metadata may be set or changed (e.g., clearing an orientation flag).

In some implementations, a media file management application may automatically generate information about a media file. For example, facial recognition information may be generated for images. Therefore, information about the new master file 312 (e.g., facial recognition features or coordinates) may be regenerated and/or recalculated and stored for the new master file 312.

If a user marks control 340, indicating a request to remove the modified media file 332, the modified media file 322 at /Previews/2012/12/09/20121209-233631/6xHfTW-ZiQOuTNk8\% x\% GhRw/result.jpg is removed or deleted from the library (e.g., deleted from the database and storage).

A user may mark one or more controls 335 to remove folders of master media files and/or mark one or more controls 345 to remove folders of modified media files. In some implementations, a UI (not shown) may be provided for a user to request removing one or more groups or set of master and/or modified media files. For example, the user may enter a date range to request removing master or modified media files created within the date range. In some implementations, a user may request removal of all master or modified media files. A user may request removal of a collection of master or modified media files, such as master media files grouped by albums, modifiers, date, and/or other criterion.

Figure 3B:
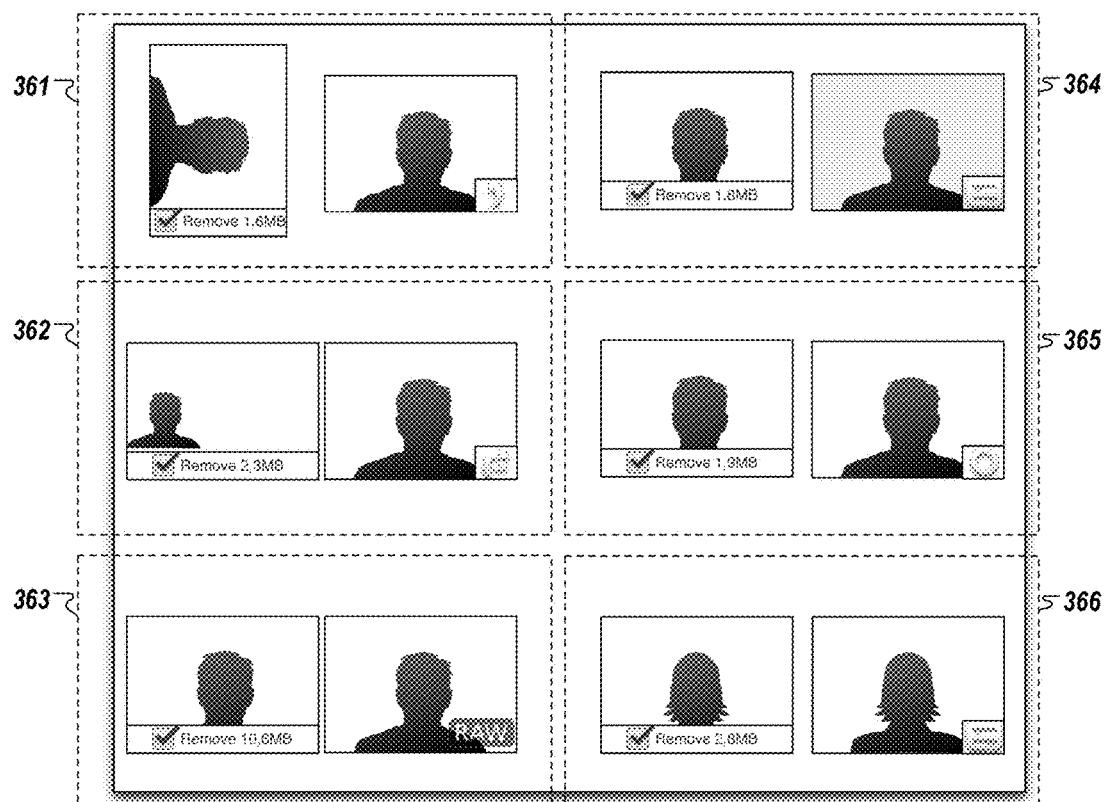
FIG. 3B shows another example user interface through which a copy of a media file may be requested to be removed.

FIG. 3B shows another example user interface (UI) through which a copy of a media file may be requested to be removed. This example UI shows that a user may request removal of a copy (e.g., the master or the modified copy) of one or more media files while viewing them (e.g., viewing the thumbnails of the media files). The UI shows, for example, six pairs 361-366 of corresponding copies of six images. On the left side of each pair may be the master or original copy (e.g., the master copy of media file 361 is shown needing 90° counter-clockwise rotation). Here, the master media files are shown, for illustration, with a checked box beside the word "Remove" to indicate that the master media files have been requested to be removed. On the right side of each pair may be the modified copy. If a modified copy of a media file is requested to be removed, a checked box beside the word "Remove" would show on the modified copy instead of the master copy.

The embodiments of the subject matter herein are applicable to any and all modifications. As shown, for example, modification for media file 316 is rotation, for 362, cropping, for 363, conversion from the RAW format, for 364 and 366, adjustment (e.g., color adjustment, contrast adjustment, resizing, changing colors, etc.), and for 365, red-eye removal. Other modifications are possible but are not shown. The Legend below the media files 361-366 may or may not be shown in the UI that shows media files 361-366.

A user may arrive at the UI in FIG. 3B from another UI (not shown) where the user requests removing of the master copy of a group of media file. If the user, after viewing the thumbnails of the media files, decides not to remove any master copy, the user may uncheck the checked box of the corresponding master copy.

In some implementations, a user may request removal of a copy of any pair of media file. For example, while viewing the thumbnails of group, 361-366 the user may Control-click a modified copy or a master copy of a pair to request its removal. (i.e., clicking on the thumbnail of the modified or master copy while holding down a Control key on the keyboard). After Control-clicking a thumbnail, a checked box and the word "Remove" may appear on the thumbnail. In some implementations, additional information associated with the copy of the media file, such as file size (e.g., 1.9 MB for the master copy of media file 365) may also appear.

The Control-click activation is just any example. Any implementation may be used, such as "R"-click, clicking on a thumbnail to show the "Remove" box the click on the box to check it, selecting one or more thumbnails and request their removal at the same time, or another implementation.

Figure 4:
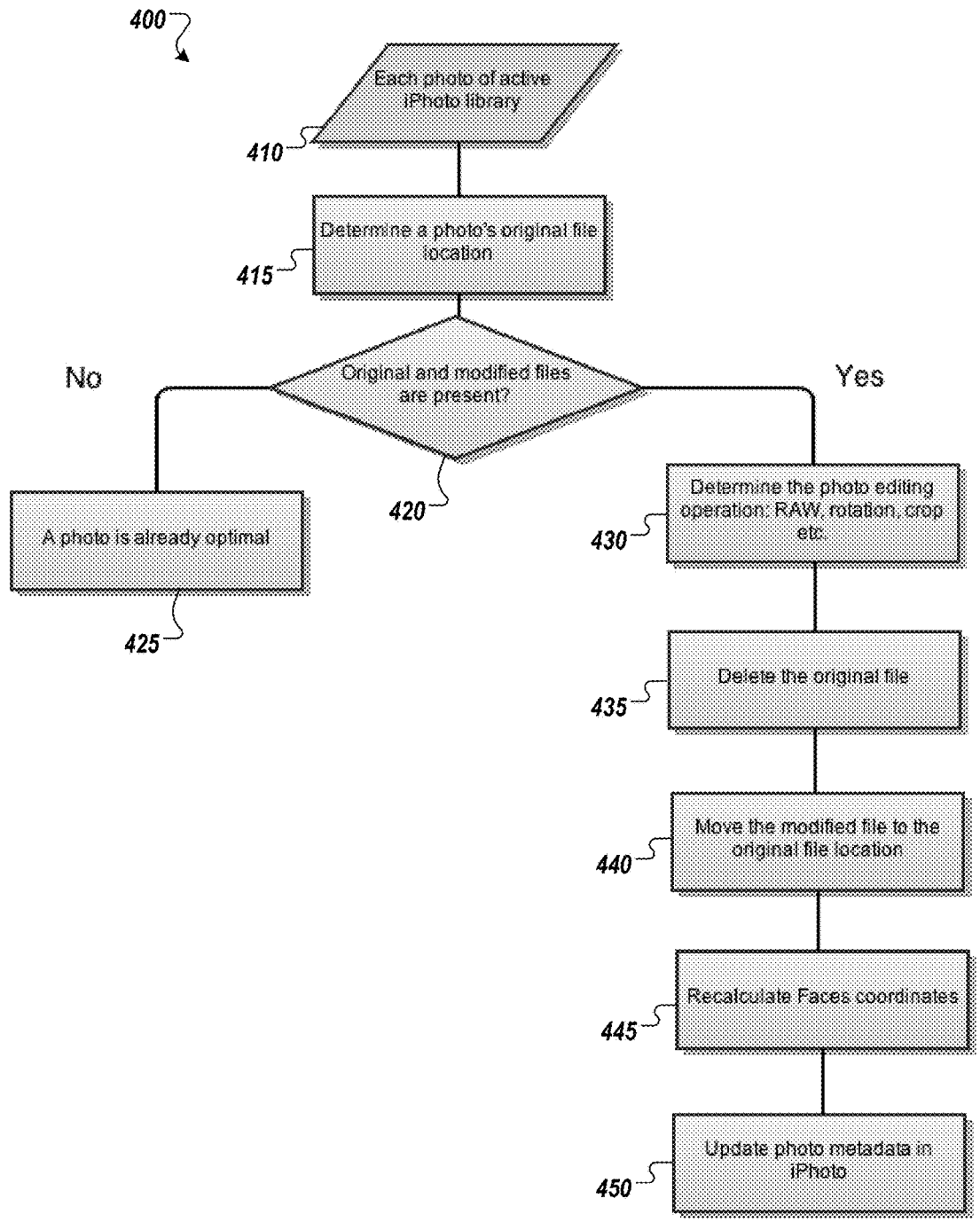
FIG. 4 shows an example process for removing the original copy of one or more media files.

FIG. 4 shows an example process for removing the original copy of one or more media files. Process 400 is illustrated with media files being images or photos managed using iPhoto. At block 410, each photo of a library may be identified (e.g., as described above using SQL query). At block 415, a photo's original file location is determined (e.g., using a SQL SELECT statement). At block 420, an analysis is made to determine (e.g., from the results of the SQL statement) whether both a master or original copy and a modified copy of the same media file exist. If only one copy exists, flows 400 branches to block 425 and the process ends because storage usage is already optimal (e.g., only one copy is stored). If however, both copies exist, process 400 flows to block 430 where modification operations are determined (different modification operations may affect the subsequent blocks in process 400).

At block 435, one or more original media files are removed or deleted. At block 440, corresponding modified media files are moved to the original media files' locations as described above. At block 445, facial recognition coordinates and/or other features may be regenerated and/or recalculated. Here, the regeneration and/or recalculation may make use of one or more modification operations determined in block 430. At block 450, metadata of the new master media files are updated, as described above.

In some examples, process 400 may be implemented with different, fewer, or more blocks. Process 400 may be implemented as computer executable instructions, which can be stored on a medium, loaded onto one or more processors of one or more computing devices, and executed as a computer-implemented method.

Figure 5:
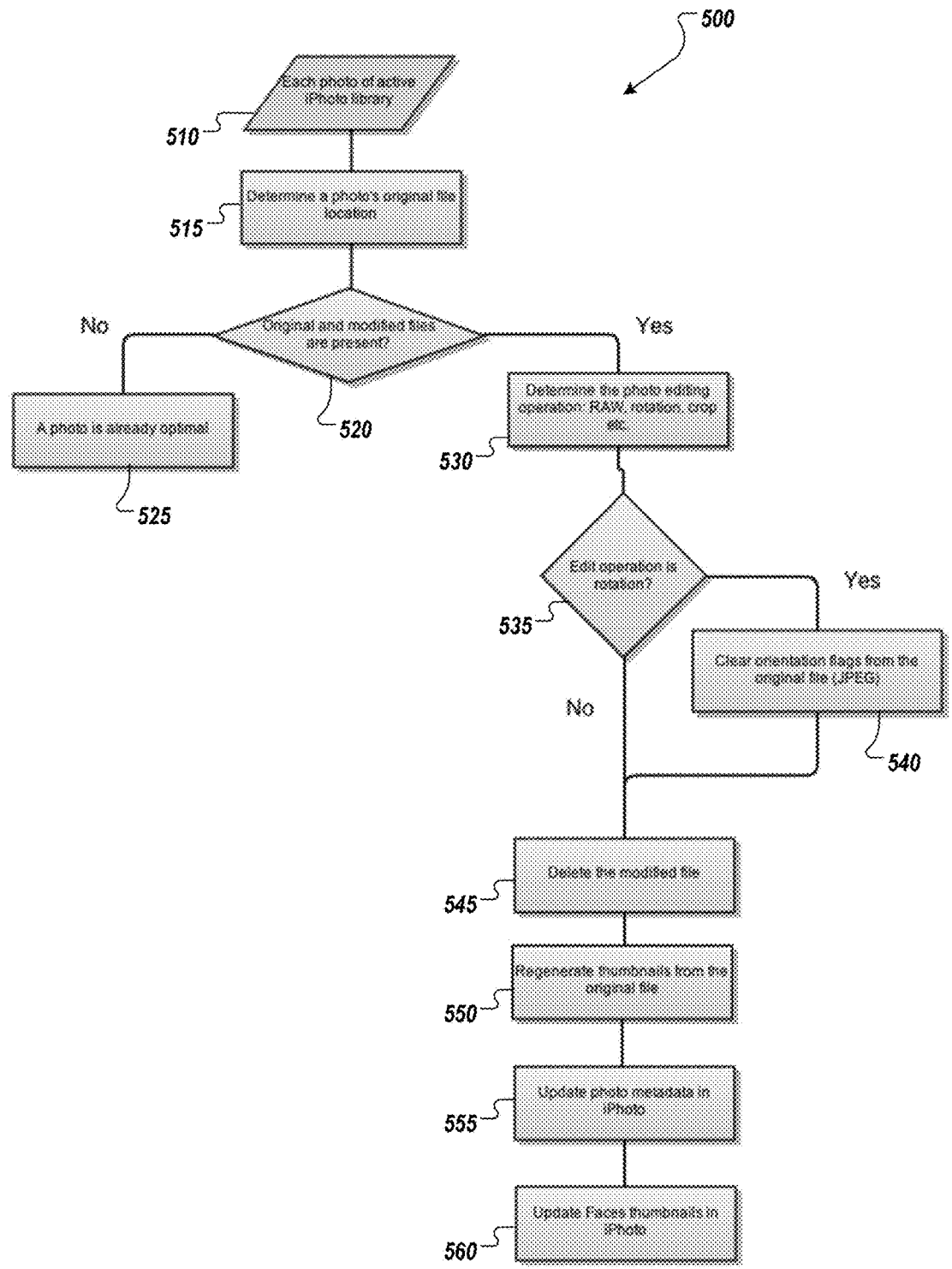
FIG. 5 shows an example process for removing the modification copy of one or more media files.

FIG. 5 shows an example process for removing the modification copy of one or more media files. Process 500 is illustrated with media files being images or photos managed using iPhoto. Blocks 510 to 530 are equivalent to blocks 410 to 430 in process 400 above.

At blocks 535, whether a rotation operation is applied to the modified copy of a photo is determined. If a rotation operation has been applied, it implies that an orientation flag or the like has been set in the original copy. At block 540, the orientation flag is cleared to prevent iPhoto from regenerating a new rotated copy on the next launch. At block 545, one or more modified media files are removed or deleted. At block 550, thumbnail images or other reduced-size images for displaying are regenerated from the master media files. At block 555, metadata for the thumbnail images or other reduced-size images for displaying are updated. At block 560, facial recognition coordinates and/or other features may be regenerated and/or recalculated for the thumbnail images or other reduced-size images for displaying.

In some examples, process 500 may be implemented with different, fewer, or more blocks. Process 500 may be implemented as computer executable instructions, which can be stored on a medium, loaded onto one or more processors of one or more computing devices, and executed as a computer-implemented method.

Figure 6A:
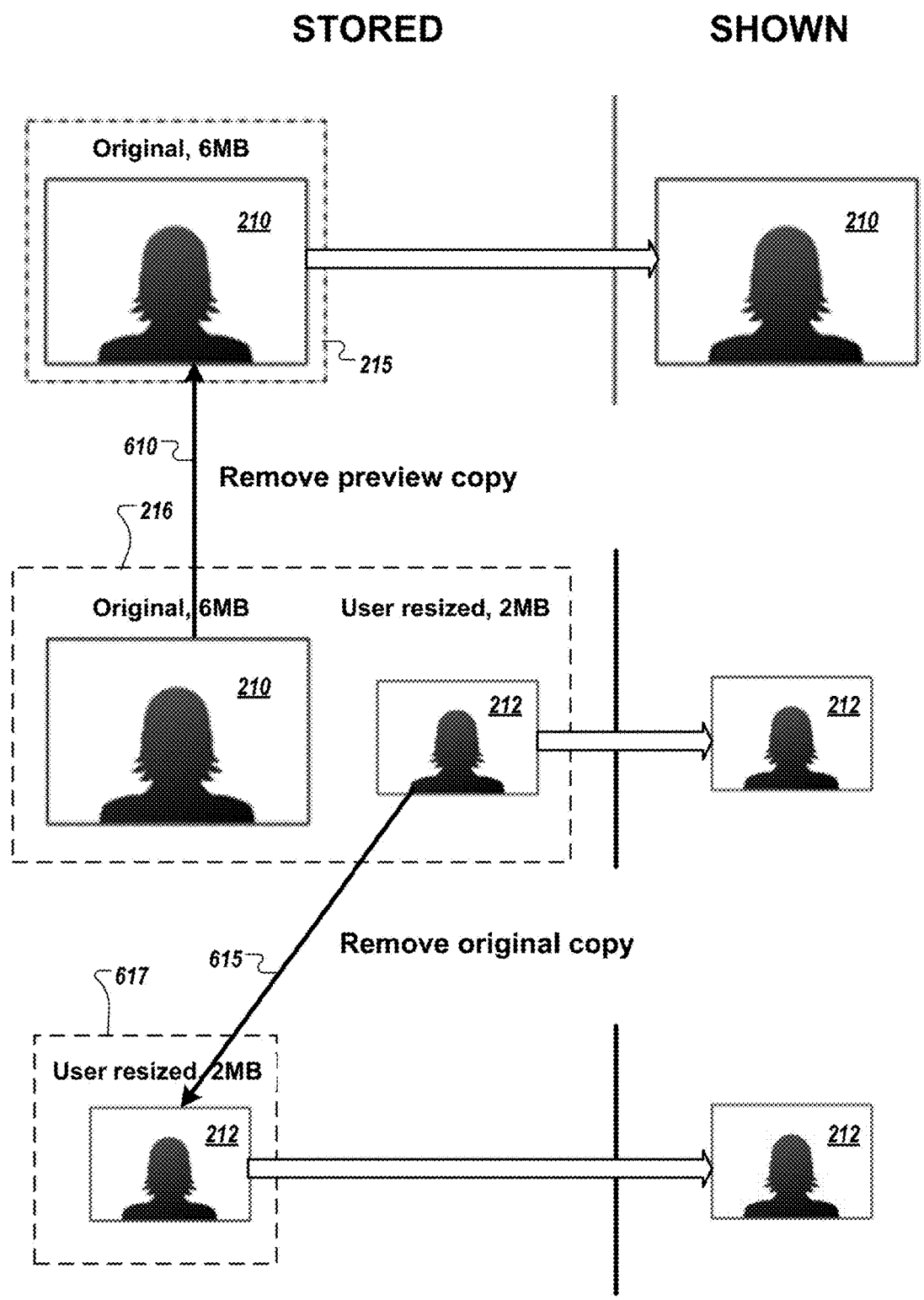
FIGS. 6A-C show the results of removing a copy of a media file.
Figure 6B:
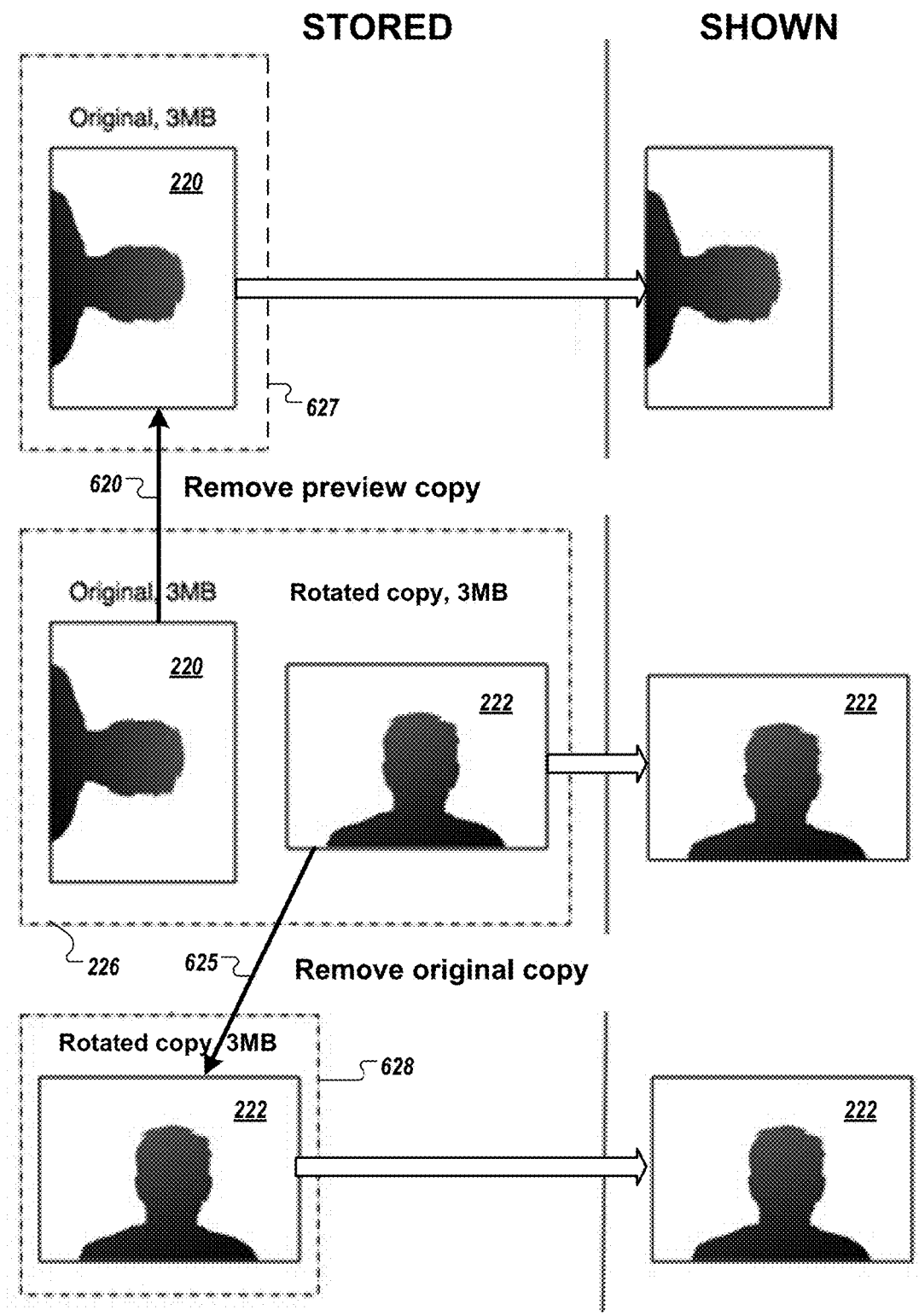
Figure 6C:
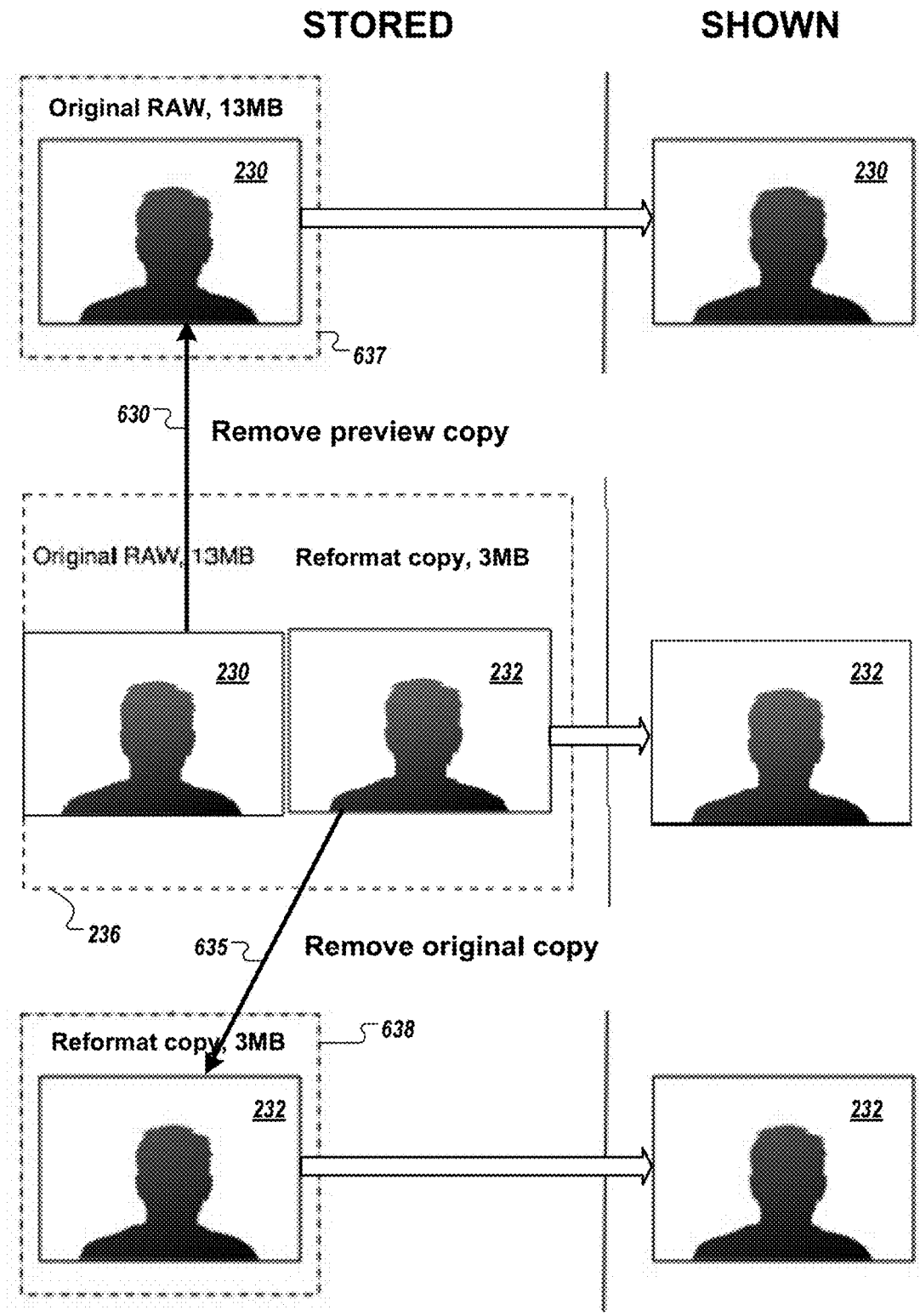

FIGS. 6A-C show the results of removing a copy of a media file. FIG. 6A shows the results of removing a copy of a media file from FIG. 2B. Starting with media files 210 and 212 in corresponding box 216, if the preview or modified media file 212 is removed, as shown in arrow 610, corresponding box 216 becomes box 215 (i.e., with no corresponding copy of media file 210, see FIG. 2A). If the original media file 210 is removed, as shown in arrow 615, corresponding box 216 becomes box 617 (i.e., with no corresponding copy of media file 212).

FIG. 6B shows the results of removing a copy of a media file from FIG. 2C. Starting with media files 220 and 222 in corresponding box 226, if the preview or modified media file 222 is removed, as shown in arrow 620, corresponding box 226 becomes box 627 (i.e., with no corresponding copy of media file 220). If the original media file 220 is removed, as shown in arrow 625, corresponding box 226 becomes box 628 (i.e., with no corresponding copy of media file 222).

FIG. 6C shows the results of removing a copy of a media file from FIG. 2C. Starting with media files 230 and 232 in corresponding box 236, if the preview or modified media file 232 is removed, as shown in arrow 630, corresponding box 236 becomes box 637 (i.e., with no corresponding copy of media file 230). If the original media file 230 is removed, as shown in arrow 635, corresponding box 236 becomes box 638 (i.e., with no corresponding copy of media file 232).

Figure 7:
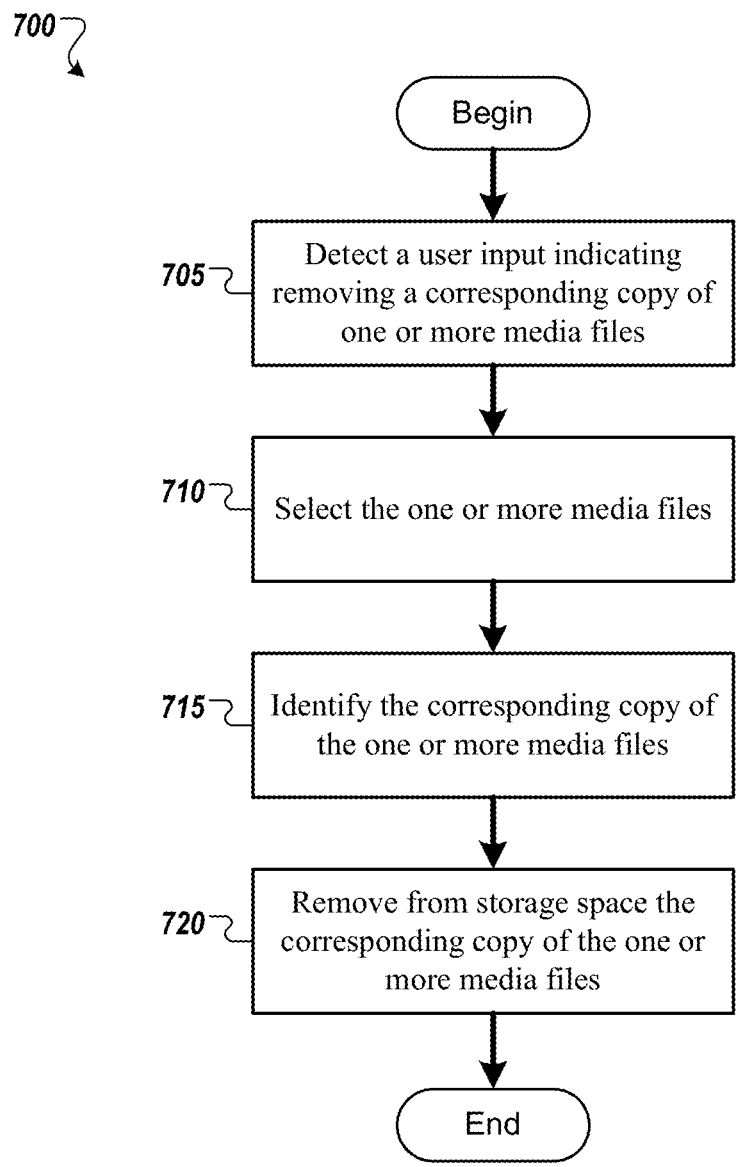
FIG. 7 shows an example implementation of a process for reclaiming storage space.

FIG. 7 shows an example implementation of a process for reclaiming storage space. Process 700 may start, at block 705, by detecting a user input indicating a request to remove corresponding copy of a group of one or more media files. For example, a user may put a checkmarks on one or more control boxes 330-345, FIG. 3. In some implementation, the detecting can be occurring automatically (e.g., without user interaction). For example, a user may set a flag that indicates automatically removal of master copy of media files that meet one or more criteria (e.g., RAW media files). Master media file that meet those criteria may be automatically marked and/or removed without user interaction. At block 710, the group of one or more media files (e.g., those affected by the removal request) may be selected, as described above in FIGS. 3A-B. For example, the group of media files may be selected based at least on another user input (e.g., date range). At block 715, the corresponding copy of the group of one or more media files may be identified, as described above in FIG. 3A-FIG. 5. At block 720, the identified corresponding copy of the group of one or more media files are removed or deleted from storage space to reclaim the storage space.

In some examples, process 700 may be implemented with different, fewer, or more blocks. Process 700 may be implemented as computer executable instructions, which can be stored on a medium, loaded onto one or more processors of one or more computing devices, and executed as a computer-implemented method.

Figure 8:
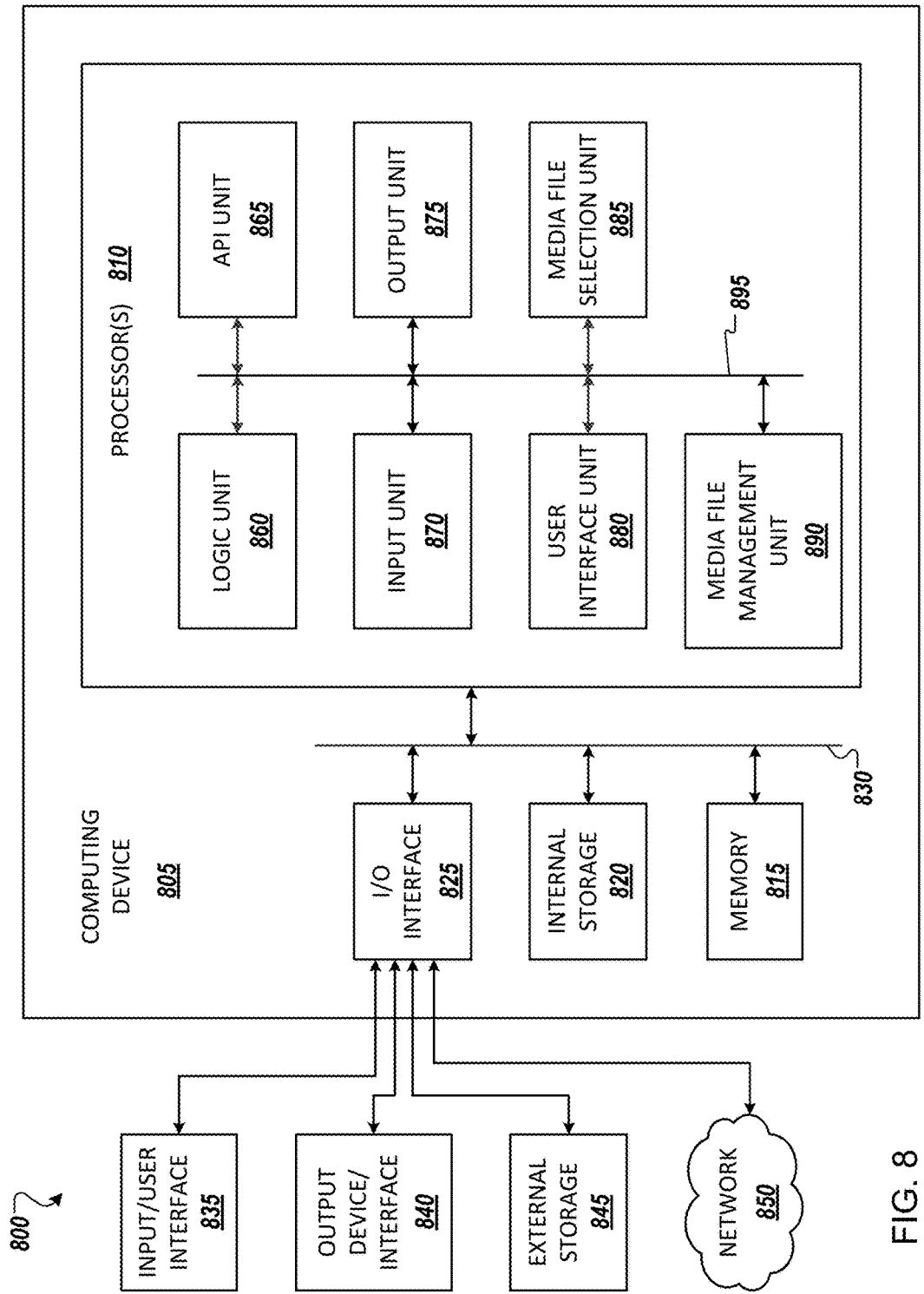
FIG. 8 shows an example computing environment with an example computing device suitable for use in some example implementations.

FIG. 8 shows an example computing environment with an example computing device suitable for use in some example implementations. Computing device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computing device 605.

Computing device 805 can be communicatively coupled to input/user interface 835 and output device/interface 840. Either one or both of input/user interface 835 and output device/interface 840 can be a wired or wireless interface and can be detachable. Input/user interface 835 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 840 may include a display, television, monitor, printer, speaker, braille, or the like. In some example implementations, input/user interface 835 and output device/interface 840 can be embedded with or physically coupled to the computing device 805. In other example implementations, other computing devices may function as or provide the functions of input/user interface 835 and output device/interface 840 for a computing device 605.

Examples of computing device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 805 can be communicatively coupled (e.g., via I/O interface 825) to external storage 845 and network 850 for communicating with any number of networked components, devices, and systems, including one or more computing devices of the same or different configuration. Computing device 805 or any connected computing device can be functioning as, providing services of, or referred to as a server, client, thin server, general machine, special-purpose machine, or another label.

I/O interface 825 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computing device 805 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 810 can execute under any operating system (OS) (not shown), in a native or virtual environment. One or more applications can be deployed that include logic unit 860, application programming interface (API) unit 865, input unit 870, output unit 875, user interface unit 880, media file selection unit 885, media file management unit 890, and inter-unit communication mechanism 895 for the different units to communicate with each other, with the OS, and with other applications (not shown). For example, user interface unit 880, media file selection unit 885, and media file management unit 890 may implement one or more processes shown in FIGS. 4, 5, and 7. The described units and elements can be varied in design, function, configuration, or implementation and are not limited to the descriptions provided.

In some example implementations, when information or an execution instruction is received by API unit 865, it may be communicated to one or more other units (e.g., logic unit 860, input unit 870, output unit 875, user interface unit 880, media file selection unit 885, and media file management unit 890). For example, after input unit 870 has detected a user input, input unit 870 may use API unit 865 to communicate the user input to user interface unit 880, which may detect that the user input is a request to remove media files. user interface unit 880 may, via API unit 865, interact with the media file selection unit 885 select one or more media files for removal or deletion. Using API unit 865, media file selection unit 885 may interact with media file management unit 890 to remove a copy of media files and update another copy of the corresponding media files.

In some instances, logic unit 860 may be configured to control the information flow among the units and direct the services provided by API unit 865, input unit 870, output unit 875, user interface unit 880, media file selection unit 885, and media file management unit 890 in some example implementations described above. For example, the flow of one or more processes or implementations may be controlled by logic unit 860 alone or in conjunction with API unit 865.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method for reclaiming storage space, comprising:
   determining, at a storage space on a storage device of a user, a location of a group of original media files, wherein the group of media files includes at least a plurality of original files, wherein the plurality of original media files are imported to an application from at least one source;
   determining, at the storage space on a storage device of a user, a location of a group of modified media files for each original media file, wherein the group of modified media files are copies corresponding to the original media file, the modified media files created by the application performing one or more operations to the original media file or one of the modified media files of the group of modified media files;
   performing an operation to generate a corresponding group of copies of the original media files, and performing a modification on the group of copies to generate a group of modified media files, and store the group of modified media files at the storage device of the user, wherein the group of original media files is imported to an application from at least one source and the group of modified media files is created by the application applied one or more operations to the group of original media files;
   performing an operation to generate a corresponding master media file for each original files;
   presenting, in a user interface, the group of original media files and the group of modified media files, wherein each original media file in the group of original media files and the corresponding group of modified file of the original media file are displayed side-by-side to each other;
   receiving a user input indicating a user request to remove a selection of one or more files from the group of original media files, wherein the selection is based on checking a checked-box next to a file in the group of original media files;
   removing from storage space the selected one or more files from the group of original media files;
   moving one or more files of the group of modified media files that correspond to the removed original media file, to the storage space of the removed original media files,
   at least one of regenerating and recalculating features of the moved modified media files, wherein the features comprise automatically generated facial recognition coordinates for the one or more files; and
   updating metadata associated with the master media file of the removed original media files, based on the moved modified media files having the regenerated and/or recalculated features
   wherein for each of the selected one or more files from the group of original media files, the user is prevented from removing the corresponding modified file in the group of modified media files.

2. The method of claim 1, wherein the selected one or more files are selected based at least on a date range.

3. The method of claim 1, wherein the selected one or more files comprise image media files.

4. The method of claim 1, wherein the application is iPhoto executed on an OS X operating system.

5. The method of claim 4, wherein the OS X operating system is executed in a virtual machine.

6. The method of claim 1, wherein the group of original media files comprises two or more original media files.

7. The method of claim 1, wherein each original media file in the group of one or more original media files corresponds to at most one modified media file in the group of one or more modified media files.

8. The method of claim 1, wherein at least one media file in the group of one or more original media files or the group of one or more modified media files is presented with a thumbnail representing at least a portion of content in the at least one media file.

9. The method of claim 1, wherein at least one modified media file in the group of one or more modified media files is modified from one original media file in the group of one or more original media file by applying one or more operations consisting of red-eye reduction, rotation, file size modification, resizing, cropping, adjustment, and format conversion.

10. A non-transitory computer readable medium having stored therein computer executable instructions for:
   determining, at a storage space on a storage device of a user, a location of a group of original media files, wherein the group of media files includes at least a plurality of original files, wherein the plurality of original media files are imported to an application from at least one source;
   determining, at the storage space on a storage device of a user, a location of a group of modified media files for each original media file, wherein the group of modified media files are copies corresponding to the original media file, the modified media files created by the application performing one or more operations to the original media file or one of the modified media files of the group of modified media files;
   performing an operation to generate a corresponding group of copies of the original media files, and performing a modification on the group of copies to generate a group of modified media files, and store the group of modified media files at the storage device of the user, wherein the group of original media files is imported to an application from at least one source and the group of modified media files is created by the application applied one or more operations to the group of original media files;
   performing an operation to generate a corresponding master media file for each original files;
   presenting, in a user interface, the group of original media files and the group of modified media files, wherein each original media file in the group of original media files and the corresponding modified file of the original media file are displayed side-by-side to each other;
   receiving a user input indicating a user request to remove a selection of one or more files from the group of original media files, wherein the selection is based on checking a checked-box next to a file in the group of original media files; and
   removing from storage space the selected one or more files from the group of modified media files;
   moving one or more files of the group of the original media files that correspond to the removed modified media files, to the storage space of the removed modified media files,
   at least one of regenerating and recalculating features of the moved modified media files, wherein the features comprise automatically generated facial recognition coordinates for the one or more files;

updating metadata associated with the master media file of the removed original media files, based on the moved modified media files having the regenerated and/or recalculated features;

wherein for each of the selected one or more files from the group of original media files, the user is prevented from removing the corresponding modified file in the group of modified media files.

11. The non-transitory computer readable medium of claim 10, wherein the application is iPhoto executed on an OS X operating system.

12. A computing device comprising storage and a processor configured to perform:

determining, at a storage space on a storage device of a user, a location of the group of one or more original media files, wherein the group of media files includes at least a plurality of original files, wherein the plurality of original media files are imported to an application from at least one source;

determining, at the storage space on a storage device of a user, a location of a group of modified media files for each original media file, wherein the group of modified media files are copies corresponding to the original media file, the modified media files created by the application performing one or more operations to the original media file or one of the modified media files of the group of modified media files;

performing an operation to generate a corresponding group of copies of the original media files, and performing a modification on the group of copies to generate a group of modified media files, and store the group of modified media files at the storage device of the user, wherein the group of original media files is imported to an application from at least one source and the group of modified media files is created by the application applied one or more operations to the group of original media files;

performing an operation to generate a corresponding master media file for each original files:

presenting, in a user interface, the group of original media files and the group of modified media files, each of which corresponds to one of the original media files, wherein any one of the original media files and any one of the modified media files can be selected, wherein each original media file in the group of original media files and the corresponding modified file of the original media file in the group of modified media files are displayed side-by-side to each other;

receiving a user input indicating a user request to remove a selection of one or more files from the group of original media files, wherein the selection is based on checking a checked-box next to a file in the group of original media files;

removing from storage space the selected one or more files from the group of original media files;

moving one or more files of the group of the modified media files that correspond to the removed original media files, to the storage space of the removed original media files, at least one of regenerating and recalculating features of the moved modified media files, wherein the features comprise automatically generated facial recognition coordinates for the one or more files; and updating metadata associated with the master media file of the removed original media files, based on the moved modified media files having the regenerated and/or recalculated features, wherein for each of the selected one or more files from the group of original media files, the user is prevented from removing the corresponding modified file in the group of modified media files.

13. The computing device 12, wherein the selected one or more files are selected based at least on a date range.

14. The computing device 12, wherein the selected one or more files comprise image media files.

15. The computing device 12, wherein the application is iPhoto executed on an OS X operating system.

* * * * *